United States Patent
Cho

(10) Patent No.: US 7,567,513 B2
(45) Date of Patent: Jul. 28, 2009

(54) METHOD OF CONTROLLING TRANSMISSION RATE BY USING ERROR CORRECTION PACKETS AND COMMUNICATION APPARATUS USING THE SAME

(75) Inventor: Young-woo Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 576 days.

(21) Appl. No.: 11/450,351

(22) Filed: Jun. 12, 2006

(65) Prior Publication Data

US 2006/0280205 A1   Dec. 14, 2006

Related U.S. Application Data

(60) Provisional application No. 60/689,083, filed on Jun. 10, 2005.

(30) Foreign Application Priority Data

Aug. 8, 2005   (KR) .................... 10-2005-0072397

(51) Int. Cl.
*H04J 3/14* (2006.01)
*G06F 15/16* (2006.01)
*H04B 1/66* (2006.01)

(52) U.S. Cl. ................... 370/235; 370/231; 370/338; 370/428; 709/233; 709/235; 375/240.27

(58) Field of Classification Search ......... 370/231–237, 370/352–356, 338, 389, 392, 401, 466; 375/240.12, 375/240.24, 240.27, E7.088; 709/224, 233, 709/235, 245; 712/221; 714/748
See application file for complete search history.

(56) References Cited

U.S. PATENT DOCUMENTS

| 6,680,922 | B1 * | 1/2004 | Jorgensen | 370/328 |
| 7,251,218 | B2 * | 7/2007 | Jorgensen | 370/235 |
| 2002/0101913 | A1 | 8/2002 | Masters et al. | |
| 2006/0129697 | A1 * | 6/2006 | Vange et al. | 709/245 |

FOREIGN PATENT DOCUMENTS

| CN | 1599453 A | | 3/2005 |
| JP | 2001-160824 A | | 6/2001 |
| JP | 2003-249960 A | | 9/2003 |
| KR | 10-2001-0019441 | * | 3/2001 |
| KR | 10-2001-0019441 A | | 3/2001 |
| KR | 10-2004-0025994 A | | 3/2004 |
| KR | 10-2005-0049019 A | | 5/2005 |
| WO | WO 01/84731 A1 | | 11/2001 |

* cited by examiner

*Primary Examiner*—Afsar M. Qureshi
(74) *Attorney, Agent, or Firm*—Sughrue Mion, PLLC

(57) ABSTRACT

A method of controlling transmission rate by using error correction packets and a communication apparatus using the same are provided. According to an embodiment of the present invention, the method of controlling transmission rate by using error correction packets includes transmitting a first packet group composed in a predetermined ratio of data packets and error correction packets, transmitting a second packet group composed of the data packets and the error correction packets in a ratio adjusted based on feedback information about the first packet group, and controlling the transmission rate based on the feedback information about the second packet group.

18 Claims, 11 Drawing Sheets

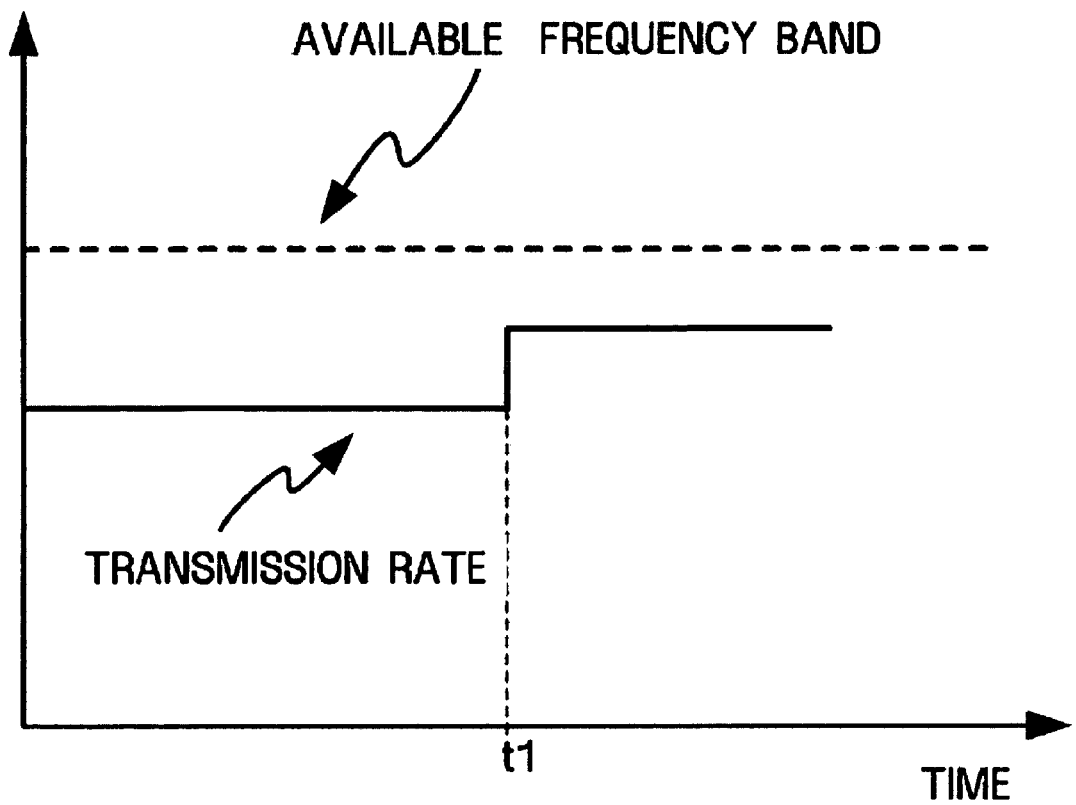

METHOD OF CONTROLLING TRANSMISSION RATE BY USING ERROR CORRECTION PACKETS AND COMMUNICATION APPARATUS USING THE SAME

CROSS-REFERENCE TO RELATED APPLICATION

This application claims priority from Korean Patent Application No. 10-2005-0072397 filed on Aug. 8, 2005 in the Korean Intellectual Property Office, and U.S. Provisional Patent Application No. 60/689,083 filed on Jun. 10, 2005 in the United States Patent and Trademark Office, the disclosures of which are incorporated herein by reference in their entirety.

BACKGROUND OF THE INVENTION

1. Field of the Invention

Methods and apparatuses consistent with the present invention relate to controlling transmission rate, and more particularly, to controlling transmission rate by using error correction packets.

2. Description of the Related Art

Recently, there has been an increasing demand for a real-time data transmission of multimedia data or voice communication on the existing networks.

With the advancements in communication and network technologies, network communication over wireless network environments using radio signals of various frequency bands has been making a widespread implementation to the existing cable-based network environments using coaxial or optical cables.

Unlike the cable-based networks, data transmission channels in wireless networks are not physically fixed. Thus, wireless networks have a limited bandwidth range compared to the cable-based networks, and have a variable traffic property often affected by the mobility of a communication apparatus and by the changes in radio link properties. As a result, in wireless networks, there is a high packet-loss rate compared to the cable-based networks.

Although communication apparatuses can transmit packets within the primary network frequency band, the frequency band decreases with the increased use by customers, resulting in a network instability that makes it difficult to ensure stable packet transmission.

Typically, packet loss occurring in wireless networks results from an inadequate bandwidth or from characteristics of radio link. When packet loss is caused by decreased bandwidth, transmission rate needs to be reduced. However, temporary packet loss is generally caused by the characteristics of radio link, and there is no need to reduce the transmission rate as in the case of decreased bandwidth. That is, when transmitting real-time data such as streaming content, it is important to assure a stable real-time data transmission by maintaining the transmission rate than to reduce the transmission rate for compensating the temporary packet loss. Accordingly, once a packet loss occurs, it is important to determine the cause to appropriately control the transmission rate.

Conventionally, the packet adjacent to a packet transmitted in a longer transmission time than expected, by a relative one-way round-trip time (ROTT), was presumed to be lost, which was considered as an instability loss. To compensate this loss, a process of re-transmitting a response packet to the transmitted packet and lost packet is conventionally required. However, such a process falls short of being adequate for the real-time transmission.

In International Patent Publication No. WO 01/84731 A1, entitled "Methods and systems for forward-error-correction-based loss recovery for interactive video transmission," discloses an error correction technique for dealing with the packet loss occurring during multimedia data transmission. However, the above invention does not disclose a method of dealing with a frequent and unavoidable situation of losing a large number of serial packets caused by decreased bandwidth.

SUMMARY OF THE INVENTION

The present invention provides methods and apparatuses to predict a frequency band by using error correction packets used for recovering lost data packets and to control the transmission rate of a network.

According to an aspect of the present invention, there is provided a method of controlling transmission rate by using error correction packets. The method includes the steps of transmitting a first packet group composed in a predetermined ratio of data packets and error correction packets to a receiving device, transmitting a second packet group having the percentage of error correction packets contained therein adjusted according to feedback information on the fist packet group, and controlling the transmission rate according to feedback information about the second packet group.

According to an aspect of the present invention, there is provided a method of controlling transmission rate by using error correction packets. The method includes the steps of transmitting a packet group composed in a predetermined ratio of data packets and error correction packets to a receiving device at a constant transmission rate and either increasing the percentage of subsequent error correction packets and the transmission rate when a total packet loss indicated by feedback information on the packet group provided by the receiving device is less than a threshold value or reducing the percentage of the subsequent error correction packets and the transmission rate when the total packet loss indicated by the feedback information is greater than the threshold value.

According to an aspect of the present invention, there is provided a communication device. The device includes a receiving device for receiving feedback information indicating information on packet loss, a control unit for adjusting the percentage of error correction packets to be sent and transmission rate according to the feedback information, a packet generating unit for providing the error correction packets and data packets in a ratio adjusted by the control unit, and a transmitting device for transmitting the packet provided by the packet generating unit at the transmission rate adjusted by the control unit.

BRIEF DESCRIPTION OF THE DRAWINGS

The above and other aspects of the present invention will become more apparent by describing in detail exemplary embodiments thereof with reference to the accompanying drawings, in which:

FIG. 10A is a diagram illustrating a bandwidth and a transmission rate according to an exemplary embodiment of the present invention;

DETAILED DESCRIPTION OF EXEMPLARY EMBODIMENTS

Figure 1:
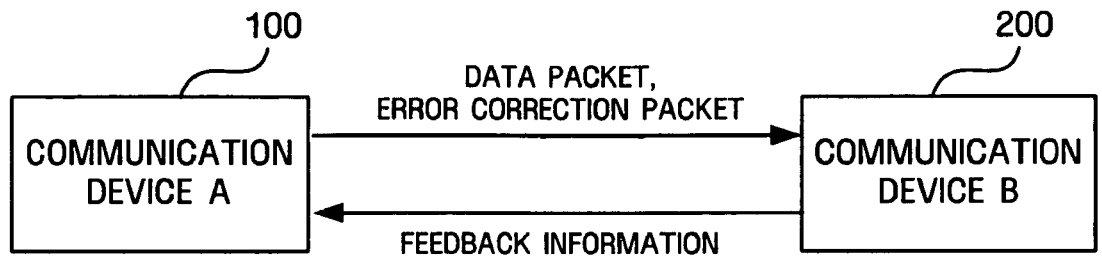
FIG. 1 is a diagram illustrating a transmission rate control system according to an exemplary embodiment of the present invention.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described in detail with reference to the accompanying drawings.

FIG. 1 is a diagram illustrating a transmission rate control system according to an exemplary embodiment of the present invention.

The transmission rate control system includes communication devices 100 and 200. Each of the communication devices 100 and 200 has a data operation capacity, and is a computing apparatus suitable for cable-based or wireless communication.

One of the communication devices 100 and 200 shown in FIG. 1 transmits a data packet containing multimedia data, and the other receives the packet and provides feedback information on the packet. Hereinafter, the communication device which transmits data packets will be referred to as a transmitting device and the communication device which receives the data packets and provides the feedback information will be referred to as a receiving device. According to an exemplary embodiment of the present invention, the communication device 100 will be referred to as the transmitting device and the communication device 200 will be referred to as the receiving device.

The transmitting device 100 transmits error correction packets together with data packets. The error correction packet is a packet having information for recovering lost data packets. An example of the error correction packet is an FEC (forward-error correction) packet. The transmitting device 100 adjusts the percentage of error correction packets to be transmitted together with data packets based on the feedback information provided by the receiving device 200, and controls transmission rate based on the feedback information indicating the packet loss of those previously transmitted in an adjusted percentage of the error correction packet contained therein.

The receiving unit 200 recovers the lost data packets by using the error correction packets if there is any packet lost among the data packets received from the transmitting device 100. At this time, the receiving device 200 provides the feedback information indicating the lost packets to transmitting device 100. The feedback information provided by the receiving device 200 includes a packet loss-rate (hereinafter, referred as a total packet loss) of the data packets received within a predetermined time from the transmitting device 100 to the entire error correction packets and the data packet loss-rate resulted from the recovery of the lost data packets by using the error correction packets. The feedback information provided by the receiving device 200 can additionally include information on a network status, quality of service, etc.

The packets are transmitted by the transmitting device 100 and the feedback information is provided by the receiving device 200 using RTP (real-time protocol) and RTCP (RTP control protocol), respectively, but the present invention is not limited to these methods.

Although not described in the figures of the present invention, there can be intermediate nodes relaying the packet transmission between the transmitting device 100 and the receiving device 200. Packet transmission pathway between the transmitting device 100 and the receiving device 200 may be either all wireless or partly wireless, which means at least one of the transmitting device 100 and the receiving device 200 can be a wireless communication device. The transmitting device 100 and the receiving device 200 can be a cellular phone, a personal data assistant (PDA), a laptop computer, but the present invention is not limited thereto.

The transmitting device 100 and the receiving device 200 according to an exemplary embodiment of the present invention are described in more detail with reference to FIGS. 2 to 5.

Figure 2:
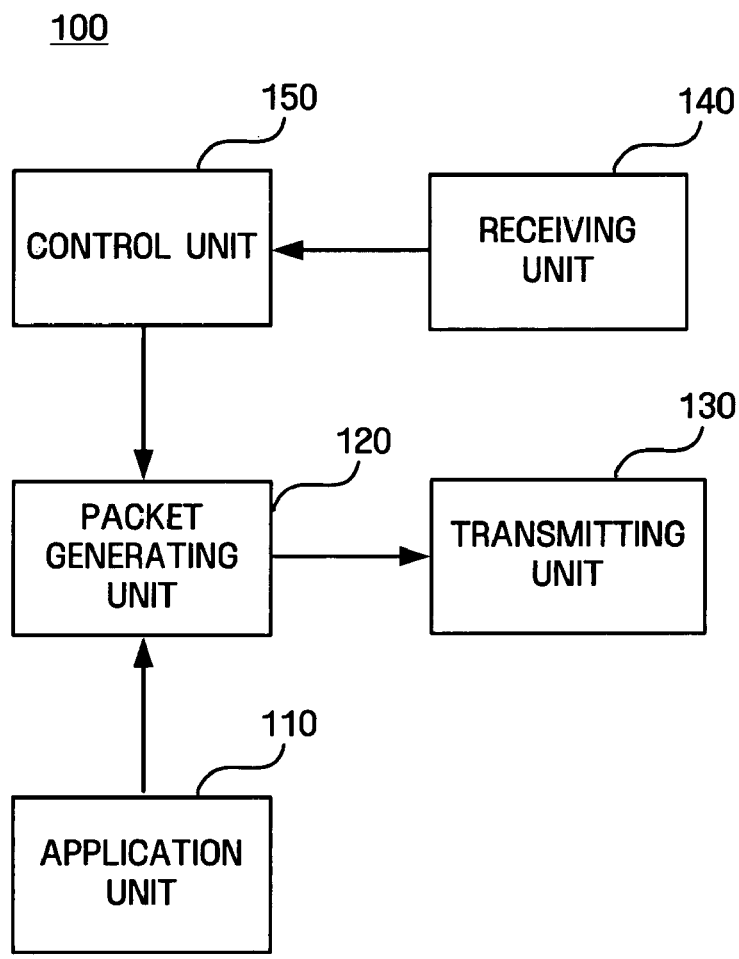
FIG. 2 is a block diagram illustrating a transmitting device according to an exemplary embodiment of the present invention.

FIG. 2 is a block diagram illustrating a transmitting device according to an exemplary embodiment of the present invention.

The transmitting device 100 illustrated in FIG. 2 includes an application unit 110, a packet generating unit 120, a transmitting unit 130, a receiving unit 140 and a control unit 150.

The application unit 110 provides data for transmission. The application unit 110 may provide multimedia data such as moving images, voice, etc. For example, when transmitting device 100 acts as a server providing motion pictures, the application unit 110 provides motion picture data coded by a compression standard such as MPEG4 or H.264.

The packet generating unit 120 generates data packets from the data provided by the application unit 110. At this time, the packet generating unit 120 can generate error correction packets along with the data packet. The error correction packets contain information for recovering the lost data packets.

An FEC packet is an example of the error correction packet. The packet generating unit 120 may implement various FEC schemes including a coding method using an XOR (exclusive OR) operation and a Reed-Solomon coding, in which information on each data packet is converted into a polynomial coefficient, in order to provide the FEC packet.

In the case of using a coding method using an XOR operation, the packet generating unit 120 generates FEC packets by performing the XOR operation between or among at least two data packets. If two data packets are used to generate one FEC packet, the packet generating unit 120 arrays two data packets in bit stream and then pads the shorter data packet close to the size of the longer packet. Then, the XOR operation is performed on the bit streams now having even lengths. The resultant bit stream composes one FEC packet.

Figure 3:
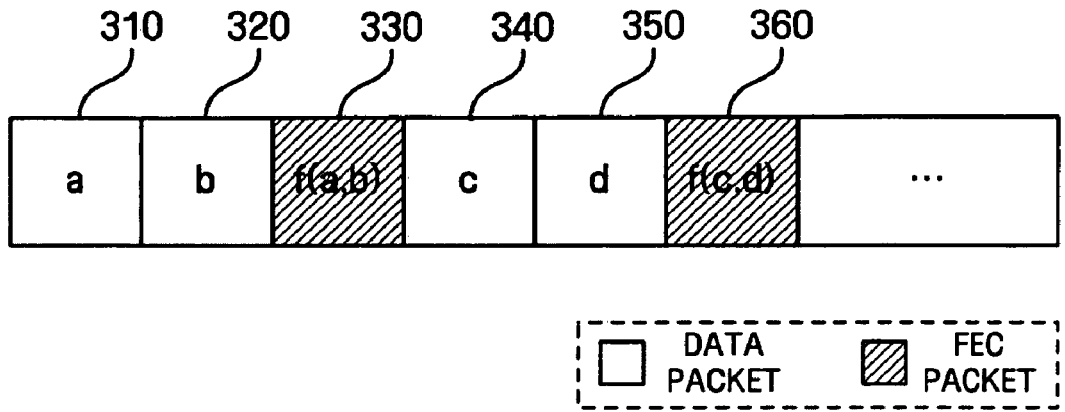
FIG. 3 is a diagram illustrating a serial packet provided by a packet generating unit shown in FIG. 2, according to an exemplary embodiment of the present invention.

FIG. 3 illustrates a packet provided by the packet generating unit 120 by the above method according to an exemplary embodiment. In FIG. 3, shaded blocks 330 and 360 indicate FEC packets and the remaining blocks 310, 320, 340, and 350 indicate data packets. The FEC packets are obtained by performing the XOR operation on two data packets. That is, f(a,b) packet 330 is obtained by performing the XOR operation on the packet 310 and the packet 320, and f(c,d) packet 360 is obtained by performing XOR operation on the packet 340 and packet 350. The packet generating unit 120 can implement RTP to generate the packets.

As shown in FIG. 2, the transmitting unit 130 transmits a serial packets provided by the packet generating unit 120 to the receiving device 200.

The receiving unit 140 receives the feedback information on packets transmitted by the transmitting unit 130 from the receiving device 200. The feedback information includes both the total packet loss-rate and the data packet loss-rate.

The control unit 150 controls the percentage of error correction packets contained in the transmitted data and the transmission rate. That is, the control unit 150 adjusts the percentage of error correction packets and the transmission rate based on the feedback information sent to the receiving unit 140 from the receiving device 200.

In FIG. 2, the transmitting unit 130 and the receiving unit 140 are illustrated as separate functional blocks, but this is only an example of embodiment and the transmitting unit 130 and the receiving unit 140 can be embodied as an integral functional block.

Figure 4:
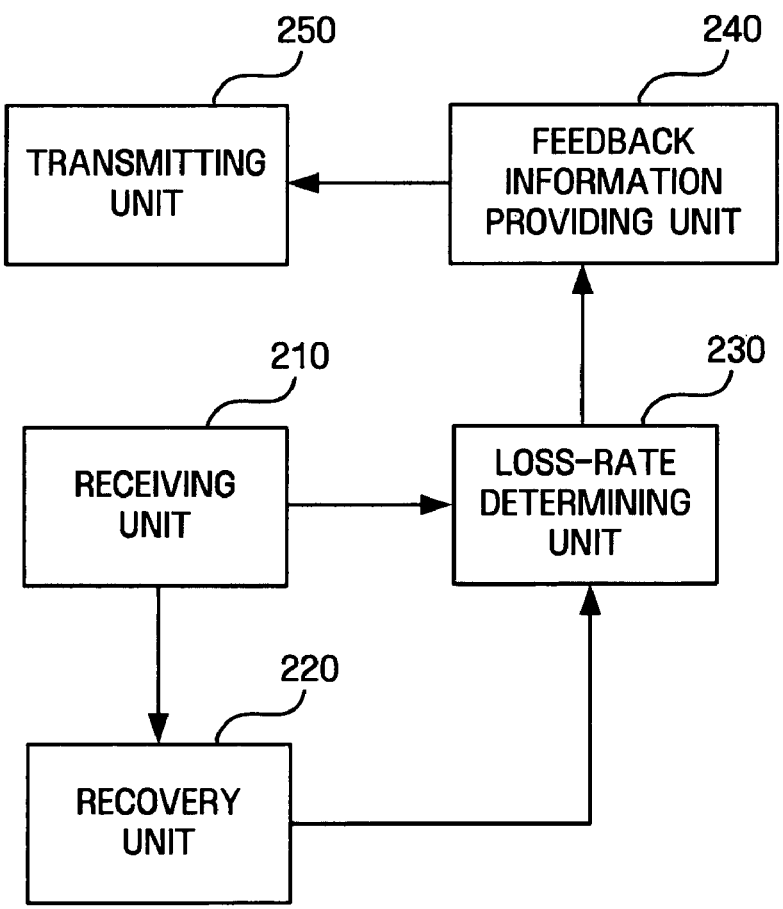
FIG. 4 is a block diagram illustrating a receiving device according to an exemplary embodiment of the present invention.

FIG. 4 is a block diagram illustrating a receiving device according to an exemplary embodiment of the present invention.

The receiving device 200 illustrated in FIG. 4 includes a receiving unit 210, a recovery unit 220, a loss-rate determining unit 230, a feedback information providing unit 240, and a transmitting unit 250.

The receiving unit 210 receives a series of packets from the transmitting device 100. The received packets include the data packets and error correction packets.

The recovery unit 220 recovers the lost data packet by using the received error correction packets. The recovery process of data packet can be performed by a complementary system for the scheme used by the transmitting device 100 to produce the error correction packets. For example, if the transmitting device 100 transmits packets as illustrated in FIG. 3, and if the packet 320 is lost among the transmitted packets, the recovery unit 220 performs an XOR operation on the packet 310 and the packet 330 to recover the packet 320.

The loss rate determining unit 230 calculates the total packet-loss of all the packets received within a predetermined time and the data packet-loss after the recovery process of the lost data packets by the recovery unit 220 has been performed (using the error correction packets received within the predetermined time). The loss of packets among those transmitted by the transmitting device 100 can be detected by confirming the sequence numbers of the received packets. The calculation process of loss by the loss-rate determining unit 230 is illustrated hereinafter according to an exemplary embodiment of the present invention with reference to FIG. 5.

Figure 5:
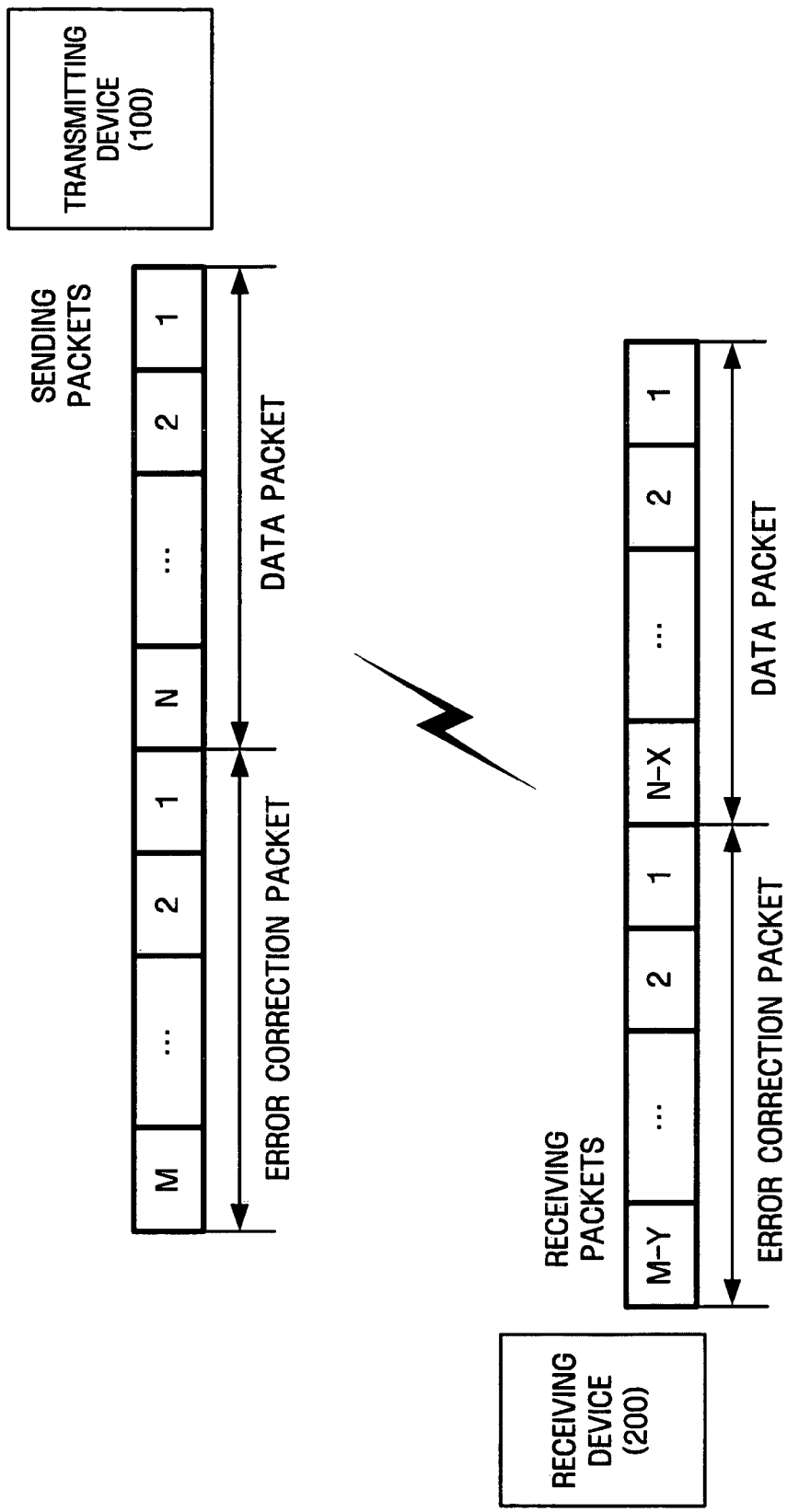
FIG. 5 is a diagram illustrating a loss rate provided by a loss rate determining unit shown in FIG. 4, according to an exemplary embodiment of the present invention.

In FIG. 5, a number marked on each packet indicates the quantity of each data packet and error correction packet, and does not indicate a sequence number. Although the error correction packets and the data packets may appear to be grouped separately in FIG. 5, the error correction packets can be distributed among the data packets as shown in FIG. 3.

As described in FIG. 5, the total number of packets transmitted to the receiving device 200 by the transmitting device 100 is obtained by adding a number N of the data packets to a number M of the error correction packets, that is, N+M. In the meantime, if the receiving device 200 receives packets without a loss, the numbers of data packets and error correction packets are N−x and M−y. That is, according to this exemplary embodiment of the invention, the number of lost data packet is x and the number of lost error correction packet is y. Thus, the total packet loss-rate to be calculated by the loss-rate determining unit 230 can be obtained by the expression $$\frac{x+y}{N+M}.$$

If the recovery unit 220 proceeds the recovery process by using the received error correction packet and as a result 'z' number of the data packets among the lost data packets is recovered, the data packet loss-rate calculated by the loss rate determining unit 230 can be obtained by the expression $$\frac{a-z}{N}.$$

The loss rate determining unit 230 calculates the loss-rate at regular intervals. Accordingly, the loss-rate determining unit 230 is able to calculate the total packet loss-rate and the data packet loss-rate of packets received before the predetermined time.

As shown in FIG. 4, the feedback information providing unit 240 provides the feedback information including the total packet loss-rate and the data packet loss-rate calculated by the loss-rate determining unit 230. In addition, the feedback information providing unit 240 further provides quality of service (QoS) such as an signal-to-noise ratio (SNR) information, a jitter space and packet delay time. The feedback information providing unit 240 uses RTCP to provide the feedback information.

The transmitting unit 250 sends the feedback information provided by the feedback information providing unit 240 to the transmitting device 100.

The receiving unit 210 and the transmitting unit 250 are illustrated in FIG. 4 as if they are separate functional blocks as an exemplary embodiment the invention, but the receiving unit 210 and the transmitting unit 250 can be embodied as an integral functional block.

In FIGS. 2 and 4, each functional block illustrated as a "unit" can be a module. The module herein means a software or a hardware component such as a field programmable gate-array (FPGA) or an application specific integrated circuit (ASIC), which has a certain function. However, the module is not limited to a software or hardware. According to compositions, a module can be included in a storage medium for addressing or can operate one or more processors. For example, a module can contain constituents such as software components, object-oriented software components, class components and task components, processors, functions, attributes, procedures, sub-routines, segments of program code, drivers, firmware, microcode, circuit, data, database, data structures, tables, arrays and variants. The components and functions of a module can be combined with or separated into smaller components and modules.

The respective operations of the transmitting device 100 and the receiving device 200 are described below in detail with reference to FIGS. 6 to 12.

Figure 6:
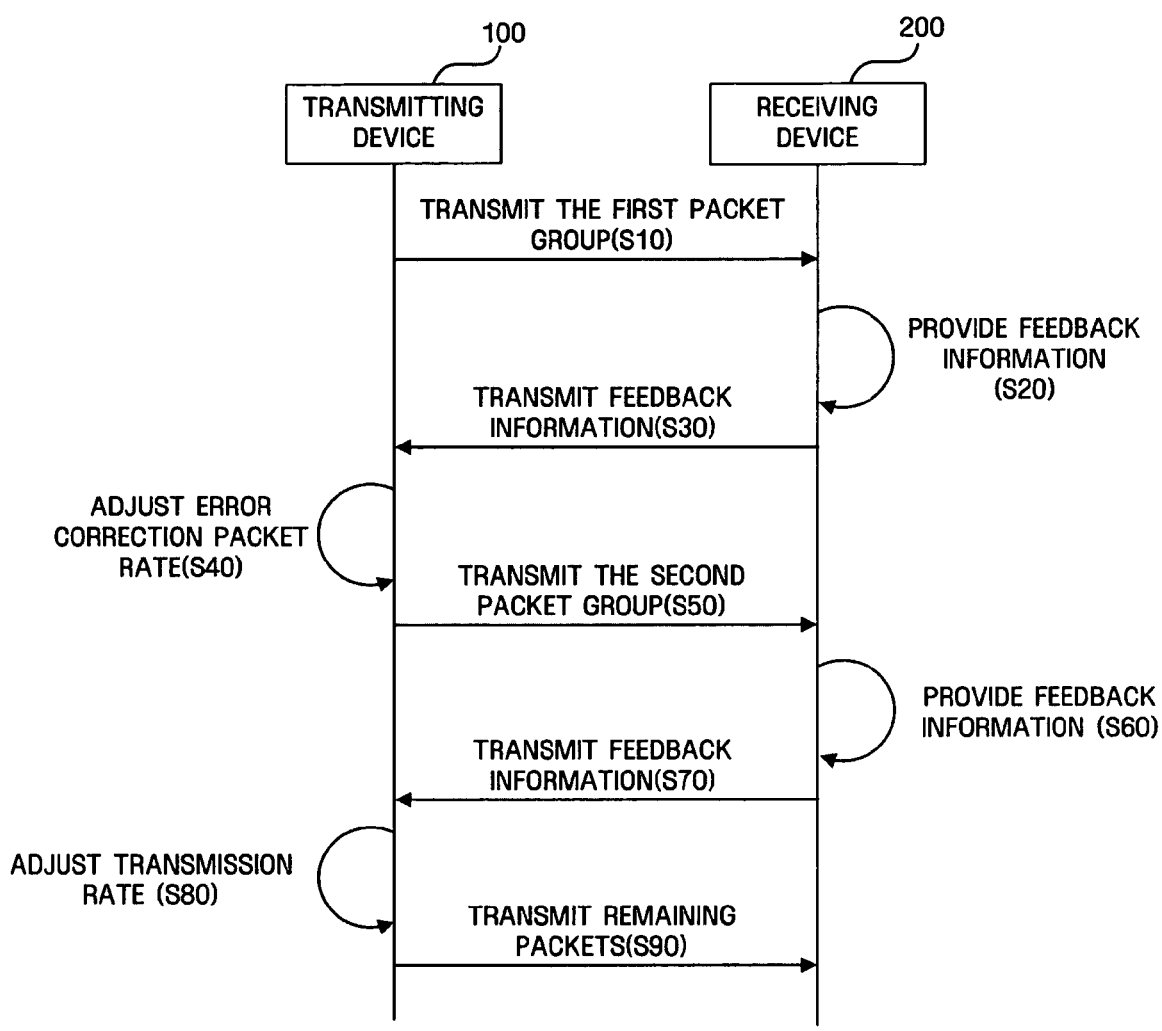
FIG. 6 is a flow chart illustrating the outline of a process of controlling a transmission rate between a transmitting device and a receiving device, according to an exemplary embodiment of the present invention.

FIG. 6 is a flow chart illustrating the outline of a process of controlling the transmission rate between the transmitting device and the receiving device according to an exemplary embodiment of the present invention.

The transmitting device 100 transmits a first packet group composed in a predetermined ratio of the data packets and the error correction packets to the receiving device 200 (S10).

Then the receiving device 200 provides the feedback information on the received first packet group and transmits the information to the transmitting device 100 (S30).

The transmitting device 100 adjusts the percentage of the error correction packets based on the feedback information on the first packet group (S40), and transmits a second packet group having adjusted with the amount of the error correction packets contained therein to the receiving device 200 (S50).

The receiving device 200 then provides the feedback information on the received second packet group (S60, and transmits the information to the transmitting device 100 (S70).

The transmitting device 100 adjusts the transmission rate based on the feedback information on the second packet group (S80), and transmits the remaining packets according to the adjusted transmission rate (S90).

Hereinafter, the respective operations of the transmitting device 100 and the receiving device 200 will be described.

Figure 7:
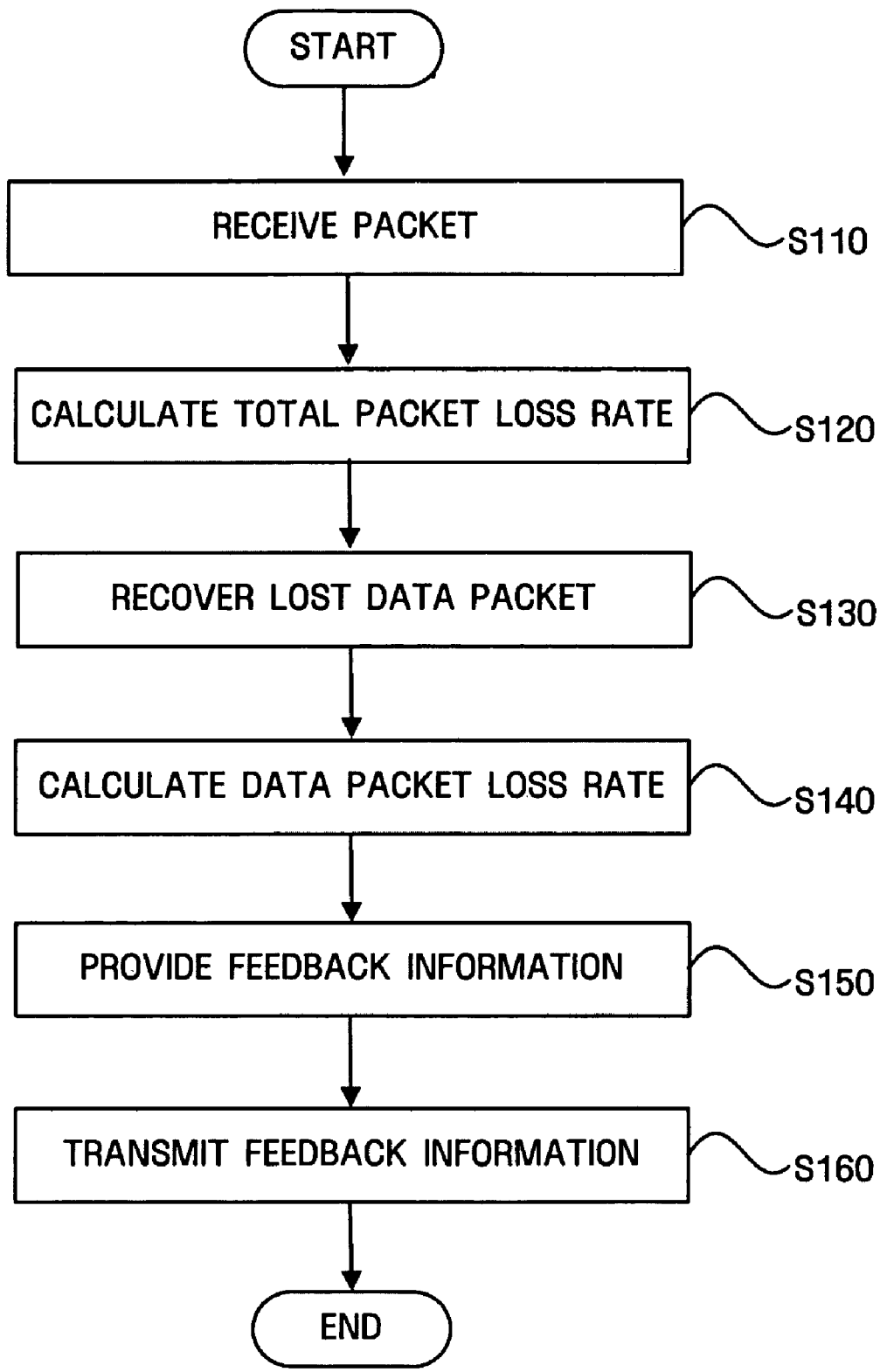
FIG. 7 is a flow chart illustrating a process of providing feedback information according to an exemplary embodiment of the present invention.

FIG. 7 is a flow chart illustrating the process of providing the feedback information according to an exemplary embodiment of the present invention. The process shown in FIG. 7 is carried out by the receiving device 200.

First, the receiving unit 210 receives a series of packets from the transmitting device 100 (S110), then the loss-rate determining unit 230 calculates the total packet loss from all packets received (S120). The total packet loss is calculated at predetermined time intervals. That is, the loss-rate determining unit 230 calculates the total loss of packets from the packets received before the predetermined time. Among the received packets, the data packets and the error correction packets are included, and the total packet loss-rate indicates the total loss of the data packets and the error correction packets received during the predetermined time interval. As illustrated in FIG. 5, the total packet loss-rate is calculated by using the ratio of the number of packets expected to the number of packets actually lost.

The recovery unit 220 recovers the lost data packets by using the received error correction packets (S130).

After completing the data packet recovery by the recovery unit 220, the loss-rate determining unit 230 calculates the data packet loss-rate (S140). As illustrated in FIG. 5, the data packet loss-rate is calculated by the ratio of the number of packets expected within the predetermined time interval to the number of data packets actually lost.

Then, the feedback information providing unit 240 provides the feedback information including both the total packet loss-rate and the data packet loss-rate calculated by the loss rate determining unit 230 (S150). The feedback information may additionally include QoS information such as an SNR information, a jitter space, a packet delay time, etc.

Next, the transmitting unit 250 transmits the feedback information to the transmitting device 100 (S160).

The process of transmitting the total packet loss-rate and the data packet loss-rate to the transmitting device 100 is carried out by RTCP. The total packet loss-rate and the data packet loss-rate are feedback information included in RTCP feedback information to be sent to the transmitting device 100.

The process shown in FIG. 7 continues by the receiving device 200 until all the packets are completely transmitted from the transmitting device 100.

The operation of the transmitting device 100 is described in detail hereinafter.

Figure 8:
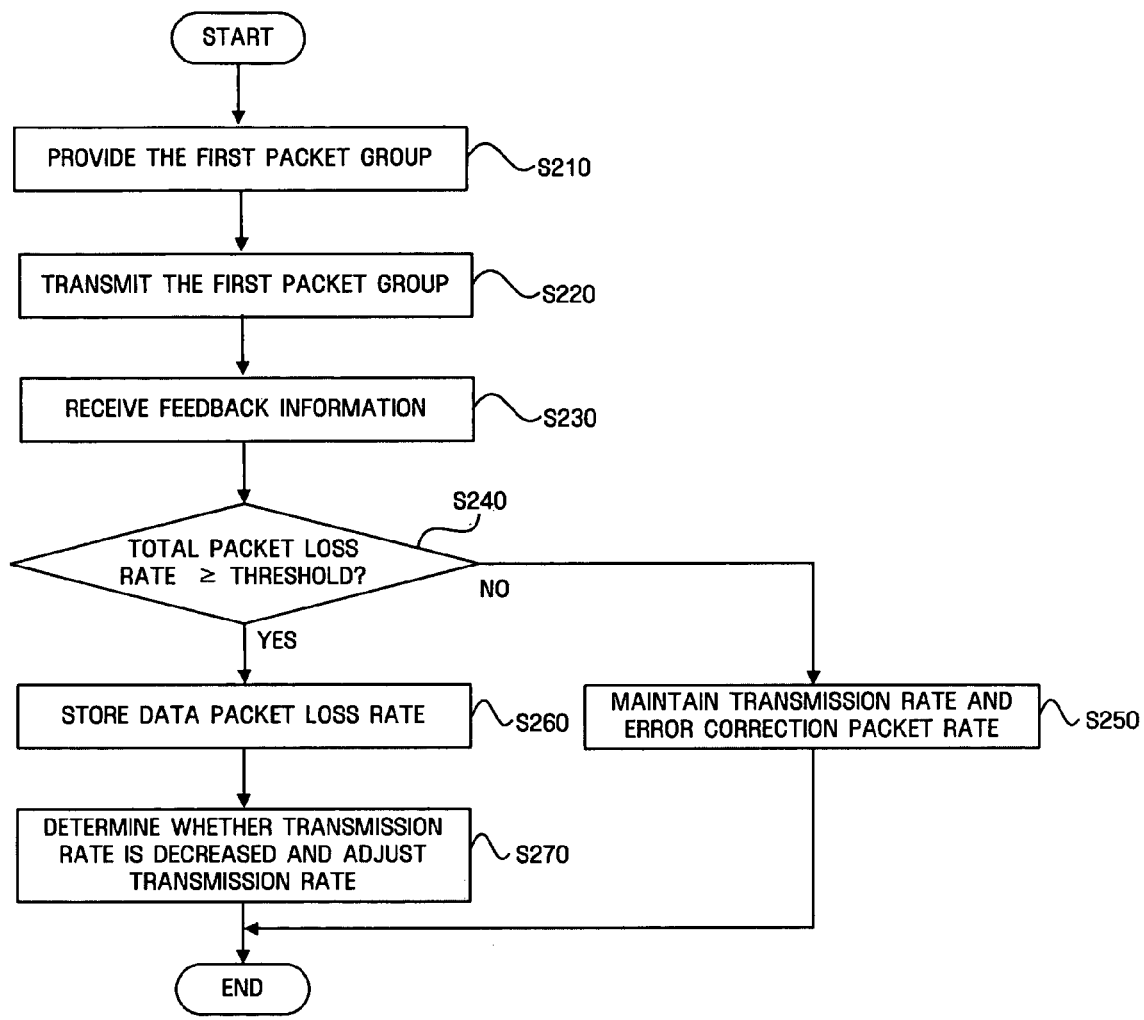
FIG. 8 is a flow chart illustrating a method of controlling transmission rate according to an exemplary embodiment of the present invention.

FIG. 8 is a flow chart illustrating a method of controlling transmission rate according to an exemplary embodiment of the present invention. The process described in FIG. 8 is carried out by the transmitting device 100.

First, the packet generating unit 120 provides a first packet group composed in a predetermined ratio of the data packets and the error correction packets (S210). Then, the transmitting unit 130 transmits the first packet group to the receiving device 200 at a predetermined transmission rate (S220). The percentage of the error correction packets and the transmission rate are determined by the control unit 150 with respect to the type of data packets, usable frequency band of network, etc.

After transmitting the first packet group by the transmitting unit 130, the receiving unit 140 receives the feedback information on the first packet group from the receiving device 200 (S230). As already described in the previous exemplary embodiments, the feedback information includes the total packet loss-rate and the data packet loss-rate.

The control unit 150 determines whether the total packet loss-rate included in the feedback information is greater than a threshold value (S240).

If the total packet loss-rate is less than the threshold value, the present packet loss is determined to be temporarily caused by the characteristics of a wireless network such as interference, etc., as the temporary packet loss does not considerably affect the packet transmission between the transmitting device 100 and the receiving device 200. Thus, if the total packet loss-rate is less than the threshold value, the control unit 150 maintains the current transmission rate and the percentage of the error correction packets contained in the packet group (S250). At this time, the packet generating unit 120 provides a packet group containing the same percentage of the error correction packets contained in the previous packet group, and the transmitting unit 130 maintains the current transmission rate.

If the total packet loss-rate is greater than the threshold value, the packet loss may be caused by an insufficient bandwidth. In this case, the control unit 150 stores the data packet loss-rate included in the feedback information (S260), and determines whether the transmission rate is reduced, to appropriately control the transmission rate (S270). This process is described in detail with reference to FIG. 9.

Figure 9:
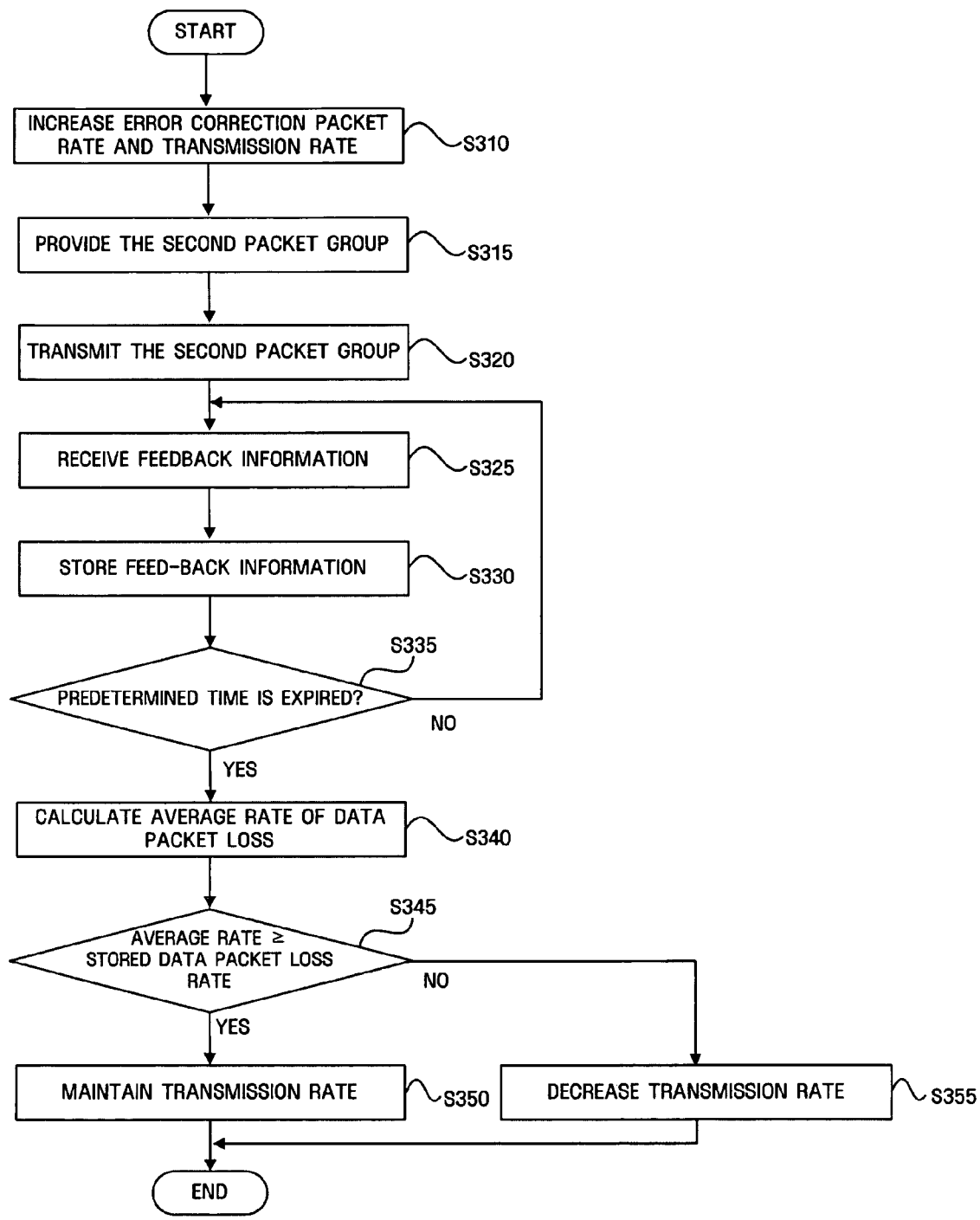
FIG. 9 is a flow chart illustrating in detail operation S270 of FIG. 8.

FIG. 9 is a flow chart illustrating in detail operation S270 of FIG. 8

If the total packet loss-rate is greater than the threshold value, the control unit 150 increases the percentage of the error correction packets contained in the packet group and the transmission rate (S310). At this time, the increase in the percentage of the error correction packets is determined by a predetermined rate or is determined in proportion to the total packet loss-rate included in the feedback information on the first packet group. The increase in the percentage of error correction packet means increase in the numbers of the error correction packets for a predetermined period output while maintaining the numbers of data packets for the predetermined period output. Thus, the increase in the transmission rate can be determined by the increase in the percentage of the error correction packet to be contained in the packet group.

By the control of the control unit 150, the packet generating unit 120 provides a second packet group having increased percentage of the error correction packets contained therein, compared to that of the first packet group (S315), and the transmitting unit 130 sends the second packet group to the receiving device 200 (S320).

When the transmitting unit 130 transmits the second packet group, the receiving unit 140 receives the feedback information on the second packet group from the receiving device 200 (S325).

Then, the control unit 150 stores the received feedback information (S330), and determines whether a predetermined time, measured from the transmission of the second packet group, has elapsed (S335). If the predetermined time has not elapsed, the control unit 150 continues to store the feedback information received by the receiving unit 140. Here, the predetermined time has a meaning different from that mentioned in FIG. 7.

If the predetermined time, measured from the transmission of the second packet group, has elapsed, the control unit 150 calculates the average rate of a packet-loss included in each feedback information received from the beginning of transmission of the second packet group and until the predetermined time has elapsed (S340).

Then, the control unit 150 compares the data packet loss-rate stored in step S260 in FIG. 8 with the average rate calculated in operation S340 in the present exemplary embodiment (S345).

As a result, if the average rate is less than the data packet loss-rate stored in operation S260 in FIG. 8, it indicates that more data packets than lost are recovered by the error correction packets, even though the transmission rate is increased. For example, as shown in FIG. 10A, with an enough bandwidth, the rate of data packet-loss caused by the increase in the numbers of the error correction packets can be reduced, even though the percentage of errors the correction packets is increased due to a larger total packet loss-rate than the threshold value, causing a small increase in the transmission rate (time t1).

In this case, it can be considered that the total packet loss-rate greater than the threshold value calculated in operation S240 in FIG. 8 is caused by a temporary packet loss attributed to the characteristics of a wireless network environment, in the presence of a sufficient bandwidth. Thus, the control unit 150 maintains the percentage of the error correction packets and the transmission rate to the same of those when the first packet group was transmitted (S350). Accordingly, the packet generating unit 120 provides a packet group containing the same percentage of the error correction packets contained in the first packet group. Then, the transmitting unit 130 sends the packet with the same transmission rate as before.

Figure 10B:
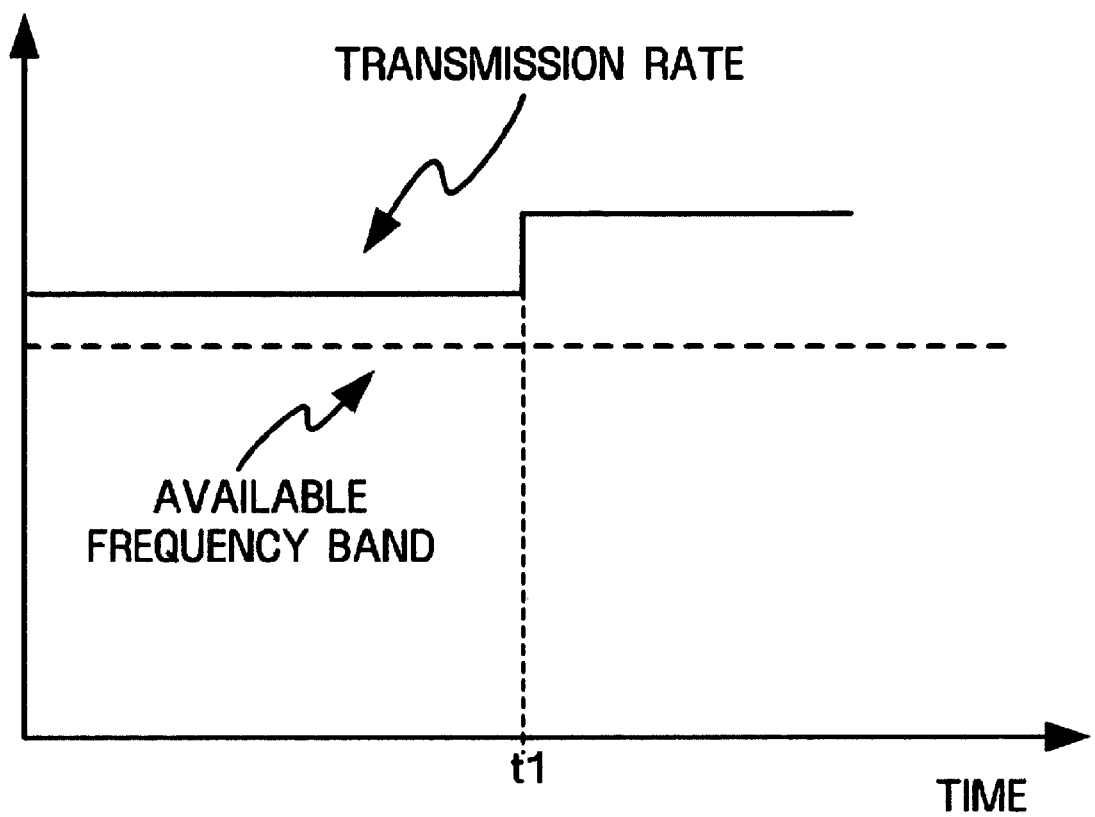
FIG. 10B is a diagram illustrating a bandwidth and a transmission rate according to another exemplary embodiment of the present invention.

After comparing the results of the process in operation S345, if the average rate is larger than the data packet loss-rate stored in operation S260 in FIG. 8, it indicates that more packets have been lost than expected by the increase in the transmission rate. For example, as shown in FIG. 10B, in the presence of an insufficient band, the total packet loss-rate is greater than the threshold value, so that the percentage of the error correction packets is increased, and as a result the transmission rate is slightly increased (time t1). Thus, more packets are lost and the data packet loss-rate is not improved, even with the increase in the percentage of the error correction packets.

In this case, it is considered that the total packet loss-rate greater than the threshold value calculated in operation S240 in FIG. 8 is caused by the packet-loss attributed to an insufficient bandwidth. Thus, the control unit 150 decreases the transmission rate, compared the transmission rate use to transmitting the first packet group (S355). The decrease in the transmission rate is either predetermined or is determined in proportion to the average rate obtained in operation S340. The control unit 150 can lower the percentage of the error correction packets rate to the same percentage contained in the first packet group.

Figure 11:
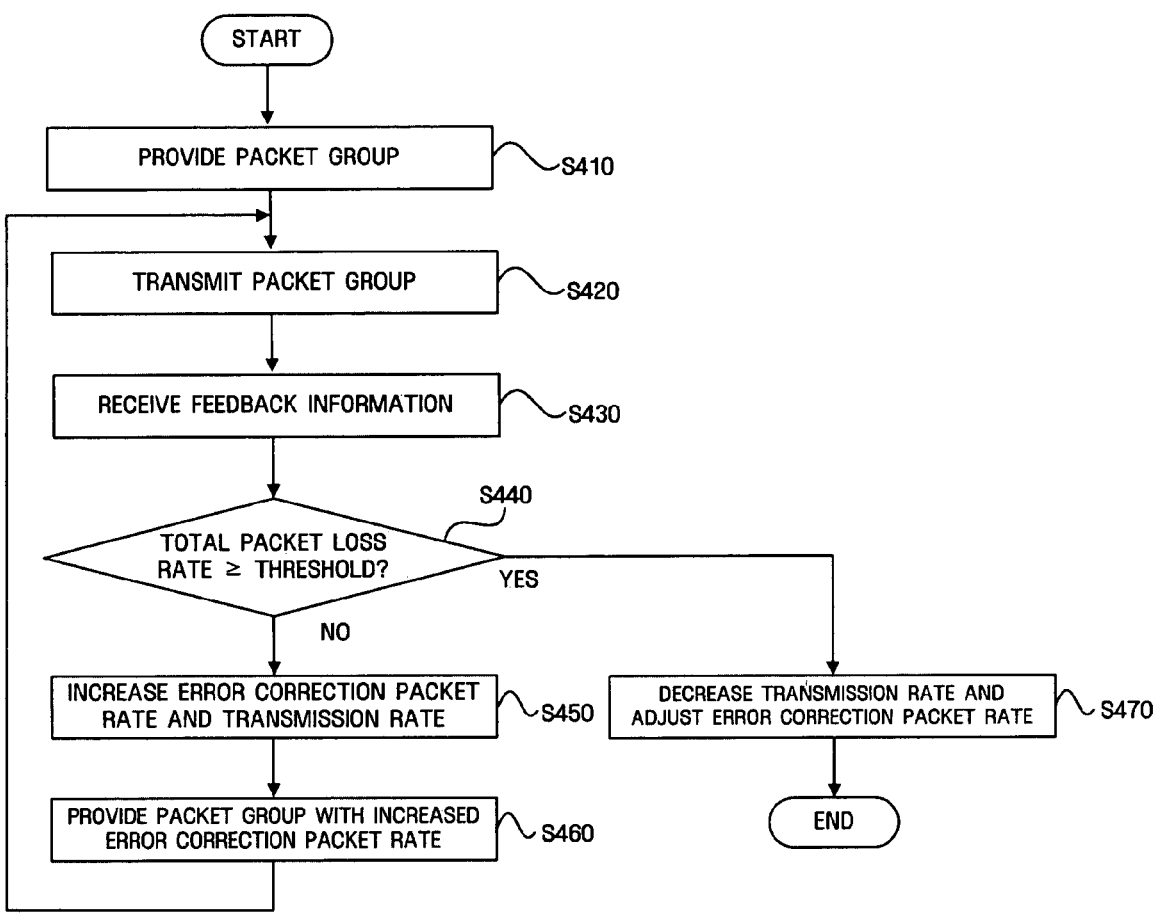
FIG. 11 is a flow chart illustrating a method of controlling transmission rate according to another exemplary embodiment of the present invention.

Even after decreasing the transmission rate lower than the predetermined transmission rate, the transmitting device 100 can increase the decreased transmission rate to the predetermined transmission rate under a required condition, as illustrated in detail in FIG. 11.

FIG. 11 is a flow chart illustrating a method of controlling transmission rate according to another exemplary embodiment of the present invention.

If the total packet loss-rate included in the feedback information received within a predetermined time, is less than a threshold value, after decreasing the transmission rate in operation S355 in FIG. 9, the transmitting device 100 searches a suitable bandwidth with respect to a network condition. The threshold value and the predetermined time mentioned in the previous exemplary embodiments of the present invention have meanings respectively different from those mentioned in FIG. 7 or FIG. 9.

The packet generating unit 120 provides a packet group composed in a predetermined ratio of the data packets and the error correction packets, then the transmitting unit 130 sends the packet group to the receiving device 200 at a predetermined transmission rate (S420). The percentage of the error correction packets contained in the packet group and the transmission rate are respectively maintained, as established in the process in operation S355 in FIG. 9.

The transmitting unit 130 transmits the packets included in a packet group. The receiving unit 140 receives the feedback information on the packet-loss of the packet group from the receiving device 200 (S430).

Then, the control unit 150 determines whether the total packet loss-rate included in the feedback information is greater than a threshold value (S440).

If the total packet loss-rate is less than the threshold value, the control unit 150 increases the percentage of the error correction packets to be contained in the next packet group together with the transmission rate (S450). The increase in the percentage of the error correction packets is determined by a predetermined ratio. The increase in the percentage of the correction packets indicates the increase in the number of the error correction packets for a predetermined period output while keeping the number of the data packets for the same predetermined period output unchanged. Accordingly, the increase in the transmission rate is determined by the increased percentage of the error correction packets. When the transmission rate is increased to a predetermined rate, by which the increase of the percentage of the error correction packets is determined.

The packet generating unit 120 provides a packet group having increased percentage of the error correction packets (S460), and the transmitting unit 130 transmits the packet group to the receiving device 200 (S420). By the repetition of processes in operations S420 and S460, the transmission rate is increased gradually.

During the processes, if the total packet loss-rate included in the feedback information received by the receiving unit 140 is determined by operation S440 to be greater than the threshold value, the present transmission rate is determined to exceed the capacity of current bandwidth, and then the control unit 150 decreases the transmission rate within a narrow range and adjusts the percentage of the error correction packets to that of when the first packet group was transmitted (S470). The level of decrease in the transmission rate is determined by a predetermined threshold value or in proportion to the total packet loss-rate. When the percentage of the error correction packets is decreased to the previous level, the packet generating unit 120 provides more data packets in a packet group but reduces the number of the error correction packets instead.

Figure 12:
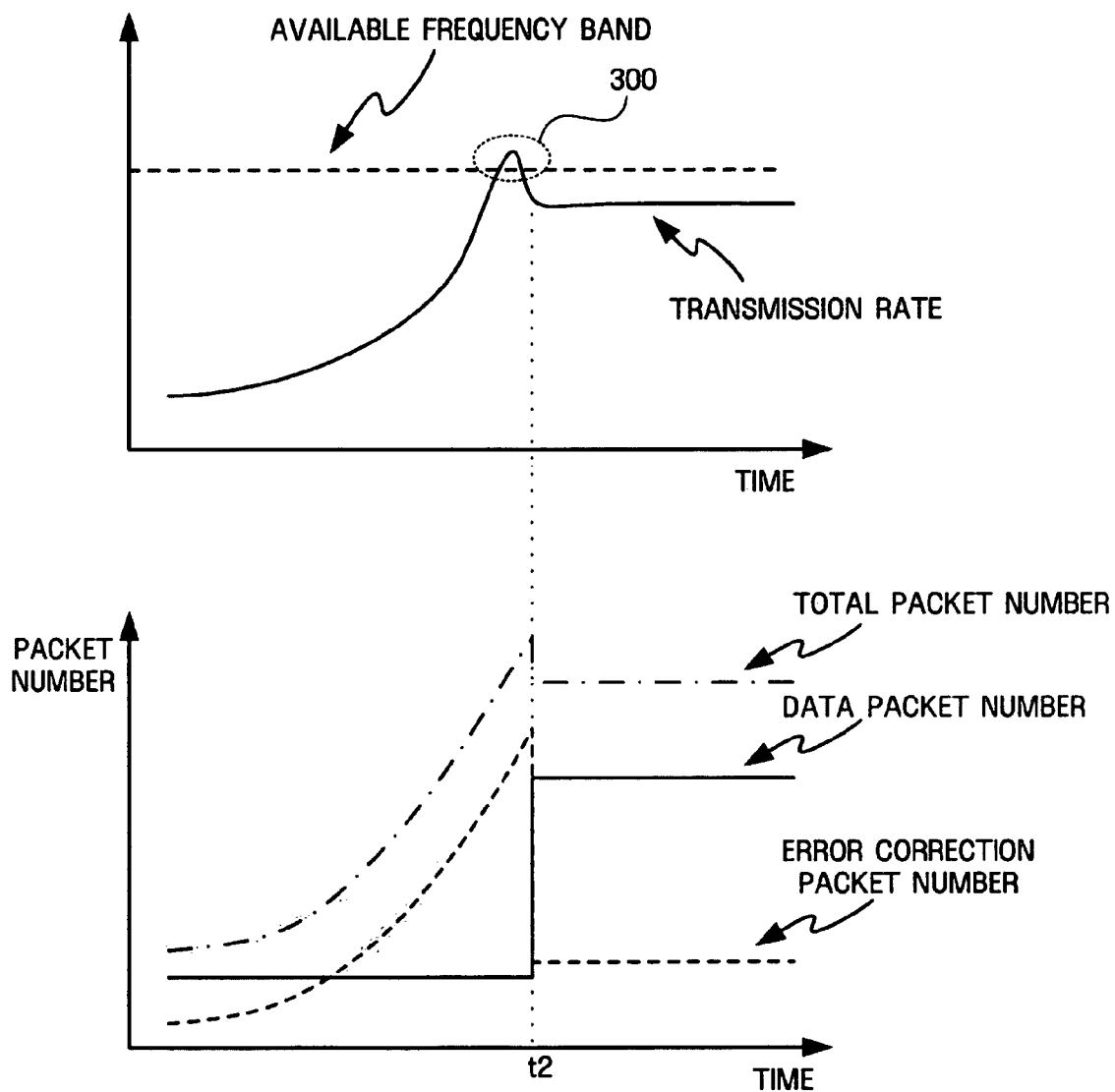
FIG. 12 is a diagram illustrating a process of controlling transmission rate according to an exemplary embodiment of the present invention.

FIG. 12 illustrates the number of packets transmitted within a predetermined period of time and changes in the transmission rate according to the process in FIG. 11.

As shown in FIG. 12, the increase in the percentage of the error correction packets results in the increase in the transmission rate. Accordingly, the transmission rate exceeds the capacity of a bandwidth 300, indicating that the total packet loss-rate included in the feedback information received from the receiving device 200 exceeds the threshold value. At this time, t2, the transmitting device 100 reduces the transmission rate within a narrow range. Thus, the transmitting device 100 maintains the transmission rate corresponding to the current bandwidth.

The number of packets outputted for the predetermined period of time can be determined according to the changes in the transmission rate. As a result, the number of the error correction packets outputted for the predetermined period is increased while the transmission rate is increased gradually. Then, at the time t2 when the transmission rate is considered to exceed the bandwidth, the transmission rate is reduced, resulting in the decrease in the number of total packets outputted for the predetermined period of time. At this time, the number of the error correction packets is decreased, that is the number of the data packets is increased and the number of the error correction packets is decreased in the packet group. Accordingly, the usable bandwidth can be predicted and the transmission rate can be increased with respect to the predicted bandwidth without having packet-loss.

According to an exemplary embodiment of the present invention illustrated in FIG. 11, the transmitting device 100 can be applied to predict a usable bandwidth at the onset of sending packets to the receiving device 200. In this case, the error correction packets and the transmission rates can be predetermined according to the type of data packets to be transmitted, network status, etc, by the control unit 150, during the process in step S410.

It will be understood by those having ordinary skill in the art that various replacements, modifications and changes in form and details may be made without departing from the spirit and scope of the present invention as defined by the following claims. Therefore, it is to be appreciated that the above-described exemplary embodiments are for the purpose of illustration only and not to be construed as a limitation of the invention.

As described above, a method of controlling transmission rate by using error correction packets and a communication apparatus using the same, according to the present invention, have the effects of predicting the bandwidth of a network by using the error correction packets and adjusting the transmission rate.

The effects of the present invention are not limited to the exemplary embodiments set forth herein. It is to be clearly understood that other effects of the present invention not described herein before will be defined by the appended claims.

What is claimed is:

1. A method of controlling transmission rate by using error correction packets, the method comprising:
   transmitting a first packet group to a device, wherein the first packet group comprises a plurality of first data packets and a plurality of first error correction packets, and a number of the first data packets to a number of the first error correction packets is a first ratio;
   transmitting a second packet group to the device, wherein the second packet group comprises a plurality of second data packets and a plurality of second error correction packets, and a number of the second data packets to a second number of the error correction packets is a second ratio which is determined based on first feedback information on the first packet group; and
   controlling a transmission rate according to second feedback information on the second packet group.

2. The method as claimed in claim 1, wherein the transmitting the second packet group comprises:
   receiving the first feedback information on the first packet group from the device; and
   transmitting to the device the second packet group, wherein a percentage of the second error correction packets of the second packet group is greater than a percentage of the first error packets of the first packet group if a total packet loss-rate included in the first feedback information on the first packet group is greater than a threshold value.

3. The method as claimed in claim 2, wherein the percentage of the error correction packets of the second packet group is proportional to the total packet loss-rate included in the first feedback information on the first packet group or is predetermined.

4. The method as claimed in claim 2, wherein the controlling the transmission rate comprises:
   receiving the second feedback information on the second packet group from the device during a predetermined time period; and
   decreasing the transmission rate if an average rate of packet loss-rates included in the second feedback information on the second packet group received during the predetermined time period is greater than a data packet loss-rate included in the first feedback information on the first packet group.

5. The method of as claimed in claim 4, wherein the decrease in the transmission rate is either in proportion to the average rate or is predetermined.

6. The method as claimed in claim 4, wherein:
   the data packet loss-rate included in the first feedback information on the first packet group is determined by the device based on results of recovering lost data packets among the first data packets included in the first packet group, using the error correction packets contained in the first packet group; and the data packet loss-rate included in the first feedback information on the second packet group is determined by the device based on results of recovering lost data packets among the second data packets included in the second packet group, using the second error correction packets included in the second packet group.

7. The method as claimed in claim 1, wherein the first and second error correction packets are forward-error correction (FEC) packets.

8. The method as claimed in claim 1, wherein the first feedback information and the second feedback information are provided by real-time protocol control protocol.

9. A method of controlling transmission-rate using error correction packet, the method comprising:

transmitting packet groups at a predetermined transmission rate to a device, each of the packet groups comprising a plurality of data packets and a plurality of error correction packets; and increasing a number of the error correction packets in the packet groups and the transmission rate if a total packet loss-rate included in feedback information from the device is less than a threshold value, or decreasing the number of the error correction packets in the packet groups and the transmission rate if the total packet loss-rate included in the feedback information is greater than the threshold value.

10. The method as claimed in claim 9, wherein the decrease in the transmission rate is proportional to the total packet loss-rate or is predetermined.

11. The method as claimed in claim 9, wherein the error correction packets are forward-error correction packets.

12. A communication apparatus comprising:

a receiving unit which receives feedback information including information on a packet loss-rate;

a control unit which determines a ratio of error correction packets to data packets and a transmission rate based on the feedback information;

a packet generating unit which generates packet groups comprising the error correction packets and data packets in the ratio determined by the control unit; and a transmitting device which transmits the packet groups generated by the packet generating unit at the transmission rate determined by the control unit.

13. The communication apparatus as claimed in claim 12, wherein the control unit increases a percentage of the error correction packets of a packet group if a total packet loss-rate included in the feedback information is greater than a first threshold value, and decreases the transmission rate if an average rate of the packet loss-rate included in the feedback information received during a predetermined time period after increasing the percentage of the error correction packets of the packet group is greater than a data packet loss-rate included in the feedback information received prior to increasing the percentage of the error correction packets of the packet group.

14. The communication apparatus as claimed in claim 13, wherein the increased percentage of the error correction packets is proportional to the total packet loss-rate included in the feedback information received prior to increasing the percentage of the error correction packets of the packet group or is predetermined.

15. The communication apparatus as claimed in claim 13, wherein the decrease in the transmission rate is proportional to the average rate of the packet loss-rate or is predetermined.

16. The communication apparatus as claimed in claim 13, wherein the data packet loss-rate included in the feedback information determined by the device based on results of recovering lost data packets in a packet group, using the error correction packets included in the packet group.

17. The communication apparatus as claimed in claim 12, wherein the error correction packets are forward-error correction packets.

18. The communication apparatus as claimed in claim 12, wherein the feedback information is provided by real-time protocol control protocol.

* * * * *